US010644632B2

United States Patent
Lee et al.

(10) Patent No.: US 10,644,632 B2
(45) Date of Patent: May 5, 2020

(54) MOTOR CONTROL DEVICE AND METHOD FOR CONTROLLING MOTOR CONTROL DEVICE

(71) Applicant: LG ELECTRONICS INC., Seoul (KR)

(72) Inventors: Donggeun Lee, Seoul (KR); Kyeongtae Kim, Seoul (KR); Jeongeon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/858,777

(22) Filed: Dec. 29, 2017

(65) Prior Publication Data

US 2018/0191286 A1 Jul. 5, 2018

(30) Foreign Application Priority Data

Jan. 2, 2017 (KR) .................. 10-2017-0000411

(51) Int. Cl.
| | |
|---|---|
| *H02P 25/089* | (2016.01) |
| *H02P 21/04* | (2006.01) |
| *H02P 6/08* | (2016.01) |
| *H02P 27/08* | (2006.01) |
| *H02P 23/26* | (2016.01) |
| *H02M 1/42* | (2007.01) |
| *H02M 1/12* | (2006.01) |
| *H02M 1/00* | (2006.01) |

(52) U.S. Cl.
CPC .............. *H02P 23/26* (2016.02); *H02M 1/12* (2013.01); *H02M 1/425* (2013.01); *H02M 1/4216* (2013.01); *H02P 27/08* (2013.01); *H02M 2001/0022* (2013.01); *H02M 2001/0025* (2013.01); *Y02B 70/126* (2013.01)

(58) Field of Classification Search
CPC .......... H02P 25/089; H02P 21/04; H02P 6/08; H02P 27/08
See application file for complete search history.

(56) References Cited

U.S. PATENT DOCUMENTS

| | | | | |
|---|---|---|---|---|
| 4,673,858 A | * | 6/1987 | Saito ...................... | H02P 27/047 318/798 |
| 5,475,293 A | * | 12/1995 | Sakai ...................... | H02P 21/04 318/802 |
| 2004/0201358 A1 | * | 10/2004 | Kawaji ................. | H02P 25/089 318/701 |
| 2008/0211449 A1 | | 9/2008 | Yamai et al. | |

(Continued)

FOREIGN PATENT DOCUMENTS

| | | |
|---|---|---|
| EP | 1 835 609 | 9/2007 |
| EP | 2 034 605 | 3/2009 |

(Continued)

OTHER PUBLICATIONS

European Search Report dated May 23, 2018 issued in Application No. 17210866.4.

(Continued)

*Primary Examiner* — Cortez M Cook
(74) *Attorney, Agent, or Firm* — KED & Associates, LLP

(57) ABSTRACT

Provided are a motor control device and a method for controlling a motor control device. Harmonics of an input current may be reduced by adjusting an output of an inverter.

20 Claims, 8 Drawing Sheets

(56) References Cited

U.S. PATENT DOCUMENTS

| | | | | |
|---|---|---|---|---|
| 2009/0108785 | A1* | 4/2009 | Takada | H02P 6/08 318/400.38 |
| 2013/0300334 | A1 | 11/2013 | Tooyama et al. | |
| 2014/0232309 | A1* | 8/2014 | Zhou | H02P 27/08 318/400.02 |

FOREIGN PATENT DOCUMENTS

| | | |
|---|---|---|
| EP | 2 040 373 | 3/2009 |
| JP | 2011-229380 | 11/2011 |
| JP | 2012-090460 | 5/2012 |
| JP | 2014-023313 | 2/2014 |
| KR | 10-2008-0024010 | 3/2008 |
| KR | 10-2011-0080346 | 7/2011 |
| KR | 10-1129100 | 3/2012 |
| KR | 10-1216464 | 12/2012 |

OTHER PUBLICATIONS

Korean Notice of Allowance dated May 31, 2018 issued in Application No. 10-2017-0000411.
Korean Office Action dated Nov. 28, 2017 issued in Application No. 10-2017-0000411.
International Search Report dated Mar. 21, 2018 issued in Application No. PCT/KR2017/012928.

\* cited by examiner

MOTOR CONTROL DEVICE AND METHOD FOR CONTROLLING MOTOR CONTROL DEVICE

CROSS-REFERENCE TO RELATED APPLICATION

This application claims priority under 35 U.S.C. § 119 to Korean Application No. 10-2017-0000411, filed on Jan. 2, 2017, whose entire disclosure is hereby incorporated by reference.

BACKGROUND

1. Field

The present disclosure relates to a motor control device and a method for controlling a motor control device, and particularly, to a motor control device without a reactor for reducing harmonics, and a method for controlling a motor control device.

2. Background

A background art of the present disclosure relates to an inverter device for controlling a motor and control thereof, and in particularly, a technique for reducing harmonics of an input current.

In the conventional inverter technology for controlling a motor, a voltage is stabilized by employing a large capacity electrolytic capacitor in a DC link part which maintains voltage stabilization between an AC/DC converter (bridge diode type) and an inverter. In the inverter configuration, since the large-capacity capacitor is employed, the configuration of the inverter is enlarged, and thus, the inverter cannot be easily designed and manufactured and manufacturing cost is increased due to the large-capacity capacitor. In order to simplify the design and fabrication of inverters and to reduce cost, as a DC Link capacitor, a small capacity capacitor, replacing a large capacitor electrolytic capacitor, has been used. However, when the small capacity capacitor is used, an LC resonance current due to inverter switching is introduced to a grid current which increases input current harmonics as compared with the conventional scheme. To solve the harmonics problem, a large-capacity DC reactor is required to be inserted between the AC/DC converter and the DC link, which, however, substantially eliminates cost reductions realized through a reduction in capacity of the capacitor.

That is, the technique of using a small capacity capacitor in the DC link part to reduce the cost and the size of the inverter increases harmonics of the input current due to pulsation and noise of a DC link voltage. As a result, performance of the inverter for controlling the motor is lowered and the circuit configuration may be damaged due to the harmonics, inevitably reducing switching efficiency of the inverter, and the cost for manufacturing and designing the inverter cannot be reduced.

BRIEF DESCRIPTION OF THE DRAWINGS

The embodiments will be described in detail with reference to the following drawings in which like reference numerals refer to like elements wherein.

DETAILED DESCRIPTION

The present disclosure disclosed in this disclosure may be applied to a motor control device and a control method of a motor control device. However, the present disclosure is not limited thereto and may also be applied to any existing motor control device using a single current sensor, a motor driving device, an inverter device controlling a motor, a control method of a motor control device, a control method of an inverter device, a controller for controlling a motor control device, a control method thereof, a control device controlling an inverter device, and a control method thereof, and may also particularly advantageously be applied to an inverter device without an LC filter, and a control method thereof.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that may be properly understood by the skilled person in the art. In addition, general terms used in the description of the present disclosure should be construed according to definitions in dictionaries or according to its front or rear context, and should not be construed to have an excessively restrained meaning.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

In describing the present disclosure, if a detailed explanation for a related known function or construction is considered to unnecessarily divert the gist of the present disclosure, such explanation has been omitted but would be understood by those skilled in the art. The accompanying drawings are used to help easily understood the technical idea of the present disclosure and it should be understood that the idea of the present disclosure is not limited by the accompanying drawings.

Hereinafter, a motor control device and a method for controlling a motor control device disclosed in this disclosure will be described with reference to FIGS. 1 to 10.

Figure 1:
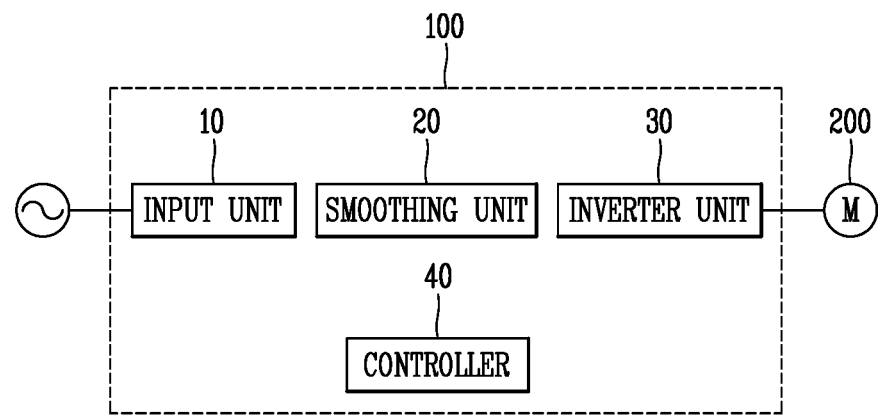
FIG. 1 is a block diagram illustrating a configuration of a motor control device disclosed in this disclosure.

FIG. 1 is a block diagram illustrating a configuration of a motor control device disclosed in this disclosure.

Figure 2:
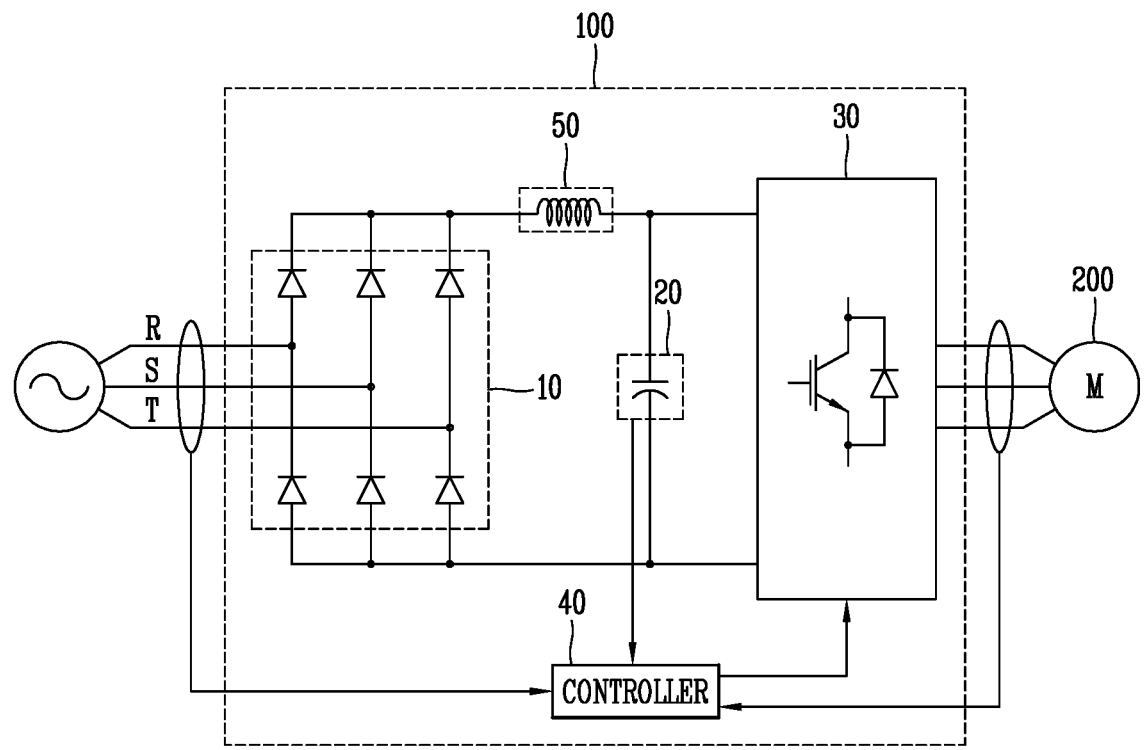
FIG. 2 is a view illustrating a configuration of an embodiment of a motor control device disclosed in this disclosure.

FIG. 2 is a view illustrating a configuration of an embodiment of a motor control device disclosed in this disclosure.

Figure 3:
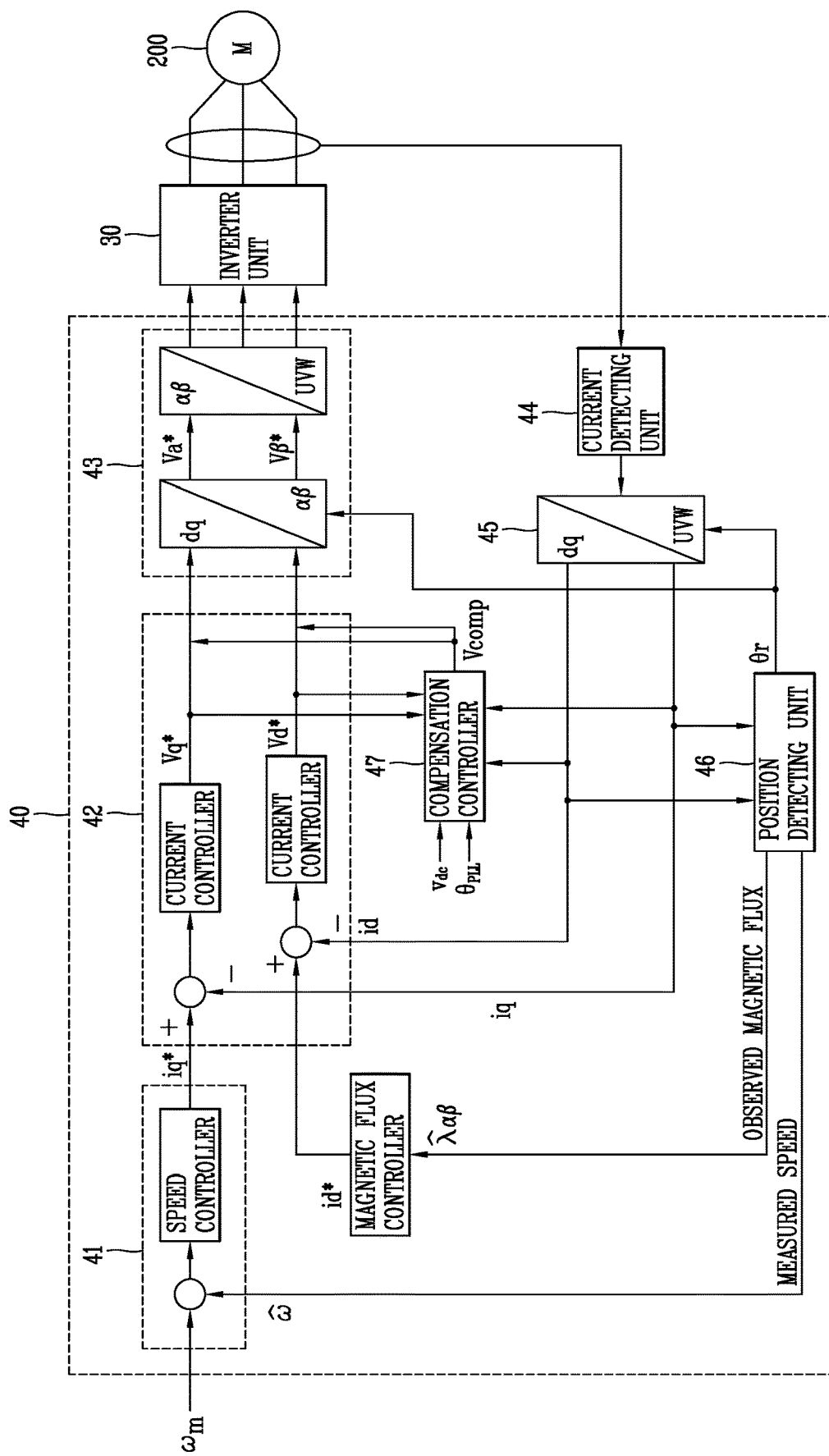
FIG. 3 is a view illustrating a configuration of a controller according to an embodiment of a motor control device disclosed in this disclosure.

FIG. 3 is a view illustrating a configuration of a controller according to an embodiment of a motor control device disclosed in this disclosure.

Figure 4:
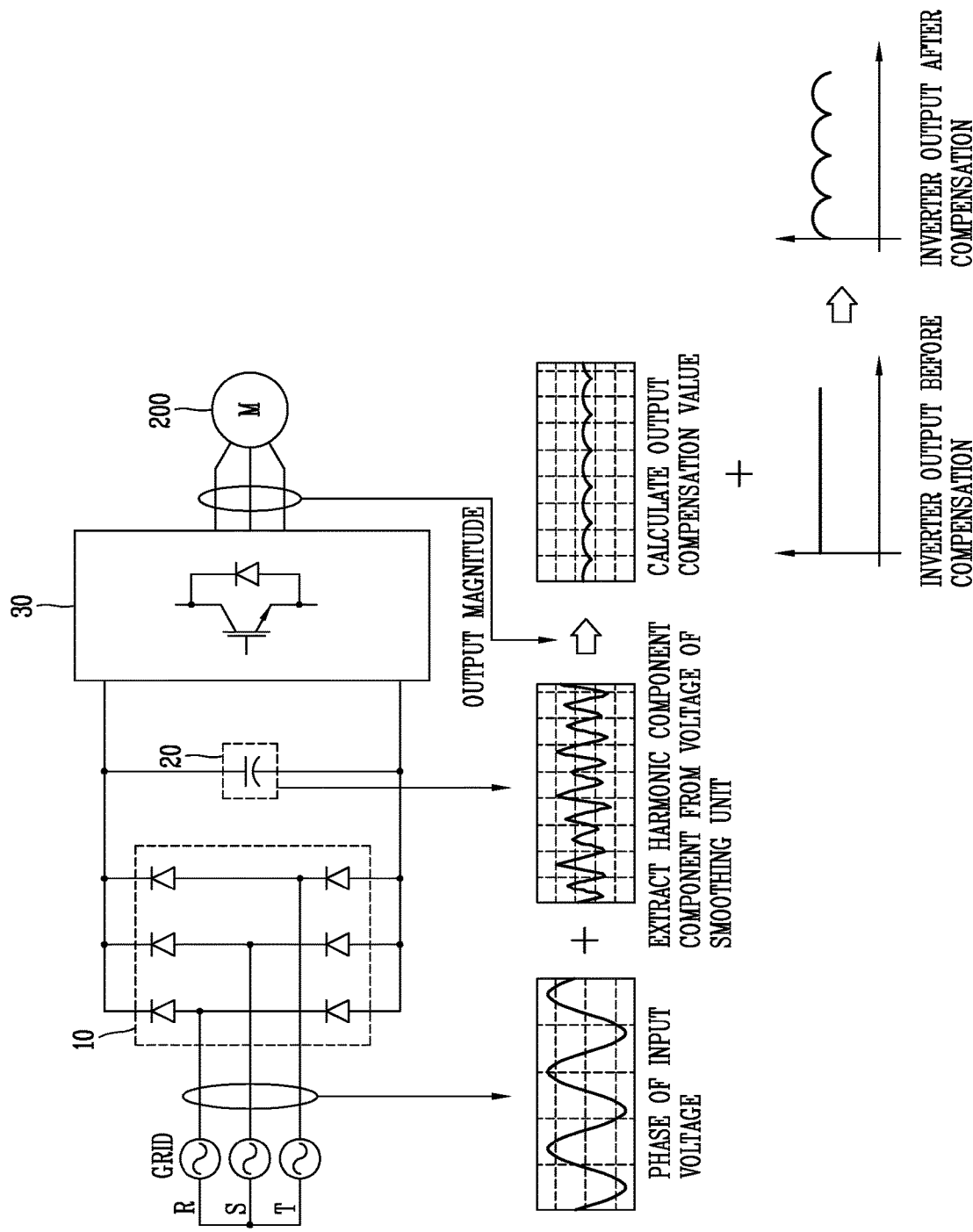
FIG. 4 is a view illustrating an example of control according to an embodiment of a motor control device disclosed in this disclosure.

FIG. 4 is a view illustrating an example of control according to an embodiment of a motor control device disclosed in this disclosure.

Figure 5:
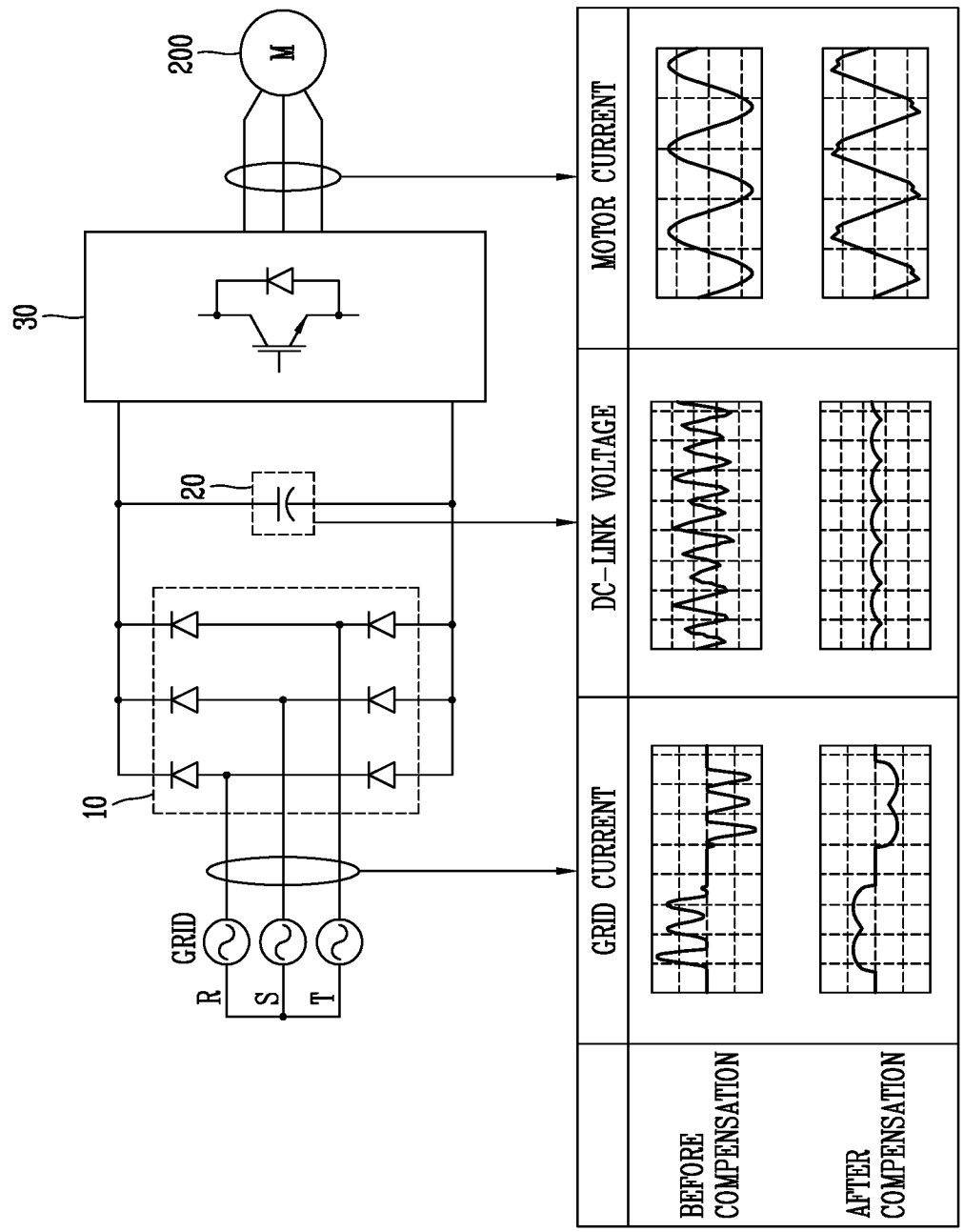
FIG. 5 is a view illustrating a control result according to an embodiment of a motor control device disclosed in this disclosure.

FIG. 5 is a view illustrating a control result according to an embodiment of a motor control device disclosed in this disclosure.

Figure 6:
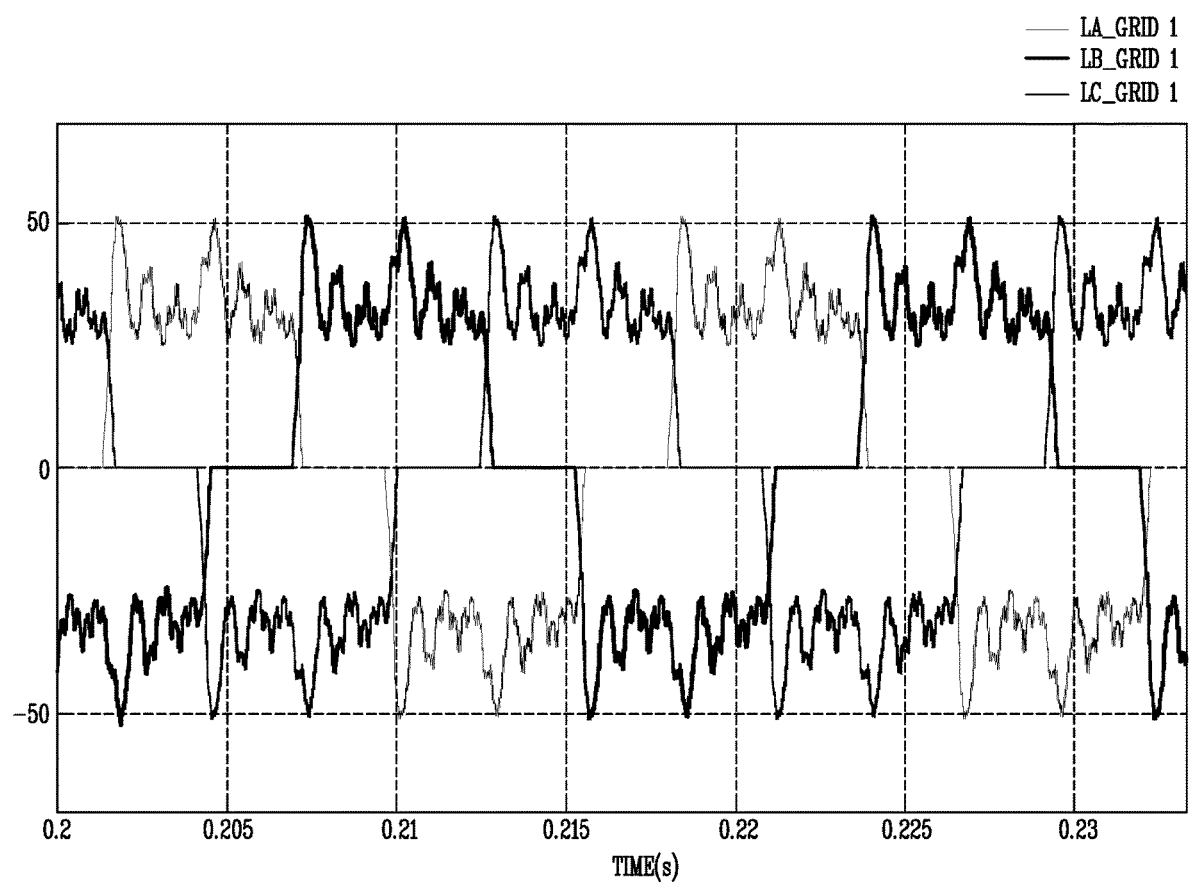
FIG. 6 is a view illustrating an example of output waveforms before harmonics of an input current is reduced according to an embodiment of a motor control device disclosed in this disclosure.

FIG. 6 is a view illustrating an example of output waveforms before harmonics of an input current is reduced according to an embodiment of a motor control device disclosed in this disclosure.

Figure 7:
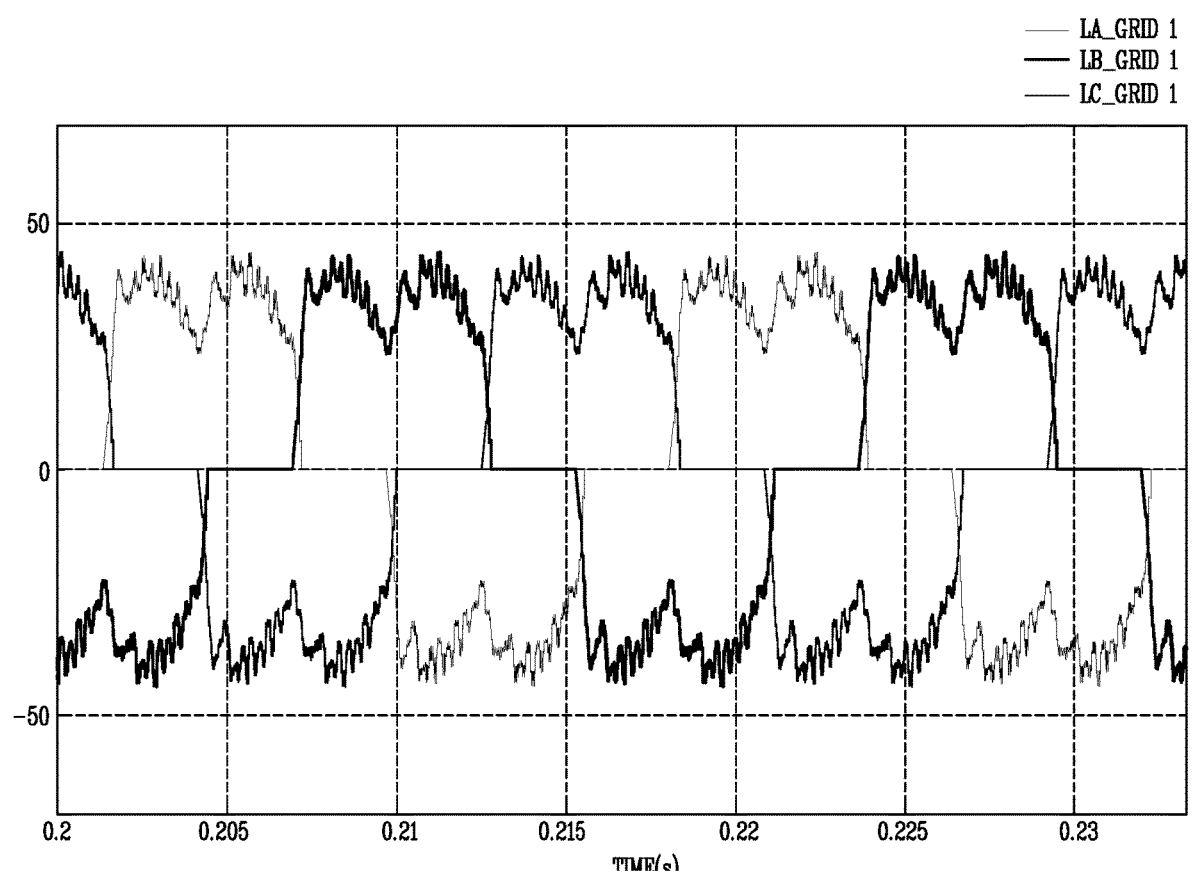
FIG. 7 is a view illustrating an example of output waveforms after harmonics of an input current is reduced according to an embodiment of a motor control device disclosed in this disclosure.

FIG. 7 is a view illustrating an example of output waveforms after harmonics of an input current is reduced according to an embodiment of a motor control device disclosed in this disclosure.

Figure 8:
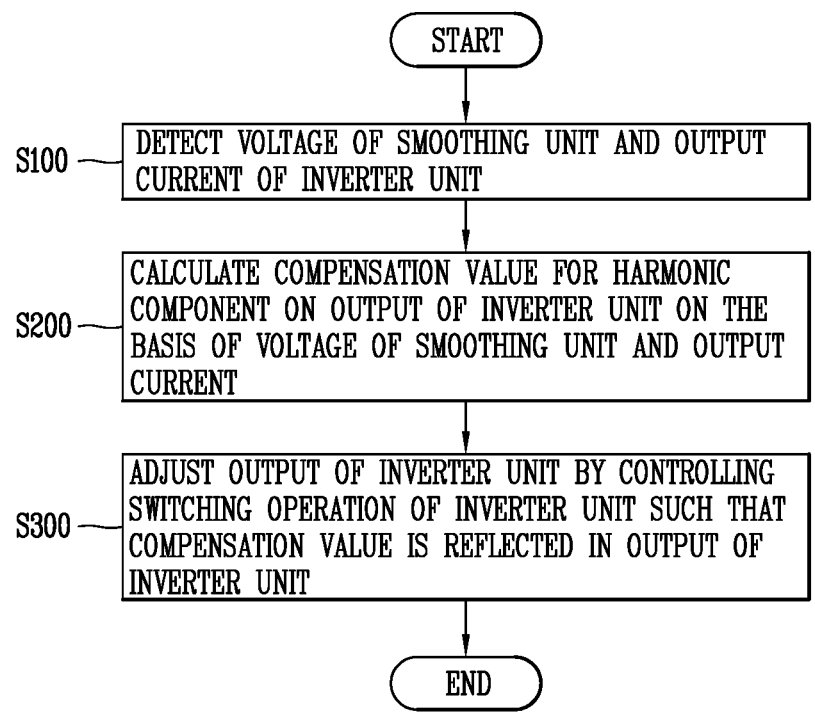
FIG. 8 is a flow chart illustrating a method for controlling a motor control device disclosed in this disclosure.

FIG. 8 is a flow chart illustrating a method for controlling a motor control device disclosed in this disclosure.

Figure 9:
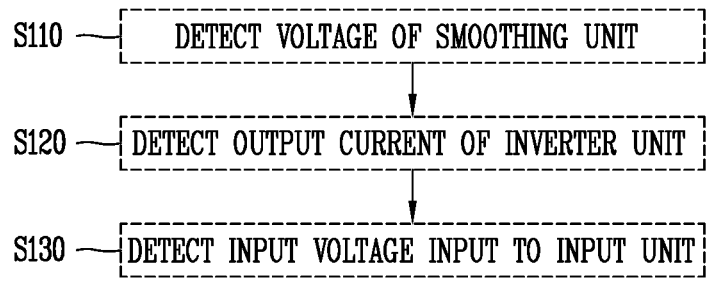
FIG. 9 is a flow chart 1 illustrating an embodiment of a method for controlling a motor control device disclosed in this disclosure.

FIG. 9 is a flow chart 1 illustrating an embodiment of a method for controlling a motor control device disclosed in this disclosure.

Figure 10:
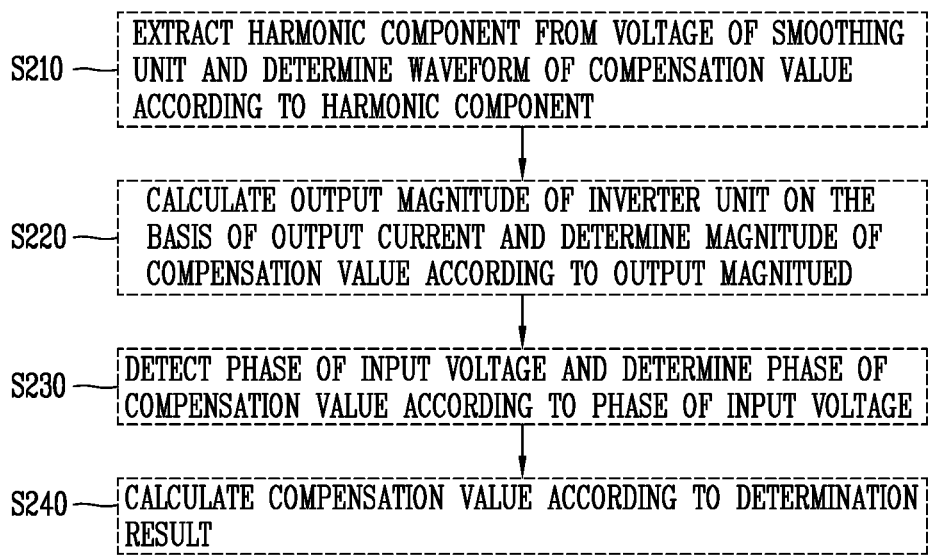
FIG. 10 is a flow chart 2 illustrating an embodiment of a method for controlling a motor control device disclosed in this disclosure.

FIG. 10 is a flow chart 2 illustrating an embodiment of a method for controlling a motor control device disclosed in this disclosure.

An aspect of the detailed description is to provide a motor control device capable of reducing harmonics of an input current without a reactor, and a method for controlling a motor control device.

Another aspect of the detailed description is to provide a motor control device capable of reducing harmonics of an input current, while using a small-capacity capacitor, and a method for controlling a motor control device.

Another aspect of the detailed description is to provide a motor control device capable of satisfying a performance condition thereof without a component for reducing harmonics, by effectively reducing low-order and high-order harmonics without an LC filter, and a method for controlling a motor control device.

In order to solve the above-mentioned problems, a motor control device and a method for controlling a motor control device disclosed in this specification feature in that harmonics of an input current are reduced by adjusting an output of the inverter.

More specifically, the output of the inverter is controlled such that a harmonic component is compensated in an output of the inverter, thereby reducing harmonics of an input current.

The motor control device (hereinafter, referred to as a 'control device') disclosed in this disclosure refers to a control device controlling driving of a motor.

The control device may be a control device not including a DC reactor of an LC filter.

The control device may be a device for controlling the motor by an inverter method.

The control device may control driving of the motor by controlling power applied to the motor through the inverter.

The control device may control a revolution per minute (RPM) of the motor by controlling power applied to the motor by controlling a switching operation of the inverter.

As illustrated in FIG. 1, the control device 100 includes an input unit 10 (e.g., rectifier circuit) for rectifying AC power input from the outside to DC power, a smoothing unit 20 (e.g., smoothing circuit or small capacity capacitor) for smoothing the rectified DC power, an inverter unit 30 (e.g., inverter) converting the smoothed DC power into AC power and outputting the converted AC power to the motor 200, and a controller 40 for controlling a switching operation of the inverter unit 30. The controller 40 reduces harmonics of an input current input to the input unit 10 by adjusting an output from the inverter unit 30 on the basis of a result of detecting a voltage of the smoothing unit 20 and an output current of the inverter unit 30.

A detailed configuration of the control device 100 is the same as illustrated in FIG. 2.

The control device 100 may further include a reactor 50 forming an LC filter with the smoothing unit 20, but, hereinafter, an embodiment of the control device 100 will be described on the premise that the control device 100 does not have the reactor 50.

When AC power is input to the input unit 10 from the outside, the input unit rectifies the input AC power into DC power.

Here, the outside may refer to a grid and the AC power may be 3-phase power supplied from the grid.

The input unit 10 may include a rectifying unit (e.g., rectifier) rectifying the input AC power into the DC power.

The rectifying unit may rectify 3-phase AC power into single phase DC power.

The rectifying unit may be a bridge diode.

The input unit 10 may be connected to the smoothing unit 20.

DC power rectified in the input unit 10 may be transmitted to the smoothing unit 20.

The smoothing unit 20 smoothes the rectified DC power received from the input unit 10.

The smoothing unit 20 may be a capacitor of an LC filter.

The smoothing unit 20 may be a DC link filter.

The smoothing unit 20 may be a film capacitor.

The smoothing unit 20 may be a small film capacitor having a small capacity.

The smoothing unit 20 may be connected to the inverter unit 30.

The DC power smoothed in the smoothing unit 20 may be transmitted to the inverter unit 30.

The inverter unit 30 converts the smoothed DC power received from the smoothing unit 20 into AC power and outputs the converted AC power to the motor 200.

The inverter unit 30 may convert the smoothed DC power into the AC power through a switching operation and output the converted AC power to the motor 200.

The inverter unit 30 may include a plurality of switching modules converting the smoothed DC power into the AC power.

The plurality of switching modules may perform a switching operation to convert the smoothed DC power into 3-phase AC power.

The plurality of switching modules may be insulated gate bipolar transistor (IGBT) modules.

That is, the inverter unit 30 may include a plurality of the insulated gate bipolar transistor (IGBT) modules.

The plurality of switching modules may be controlled in a switching operation by the controller 40.

That is, the inverter unit 30 may be controlled by the controller 40.

The plurality of switching modules may receive a control signal regarding the switching operation from the controller 40 and perform a switching operation according to the control signal to convert the smoothed DC power into the 3-phase AC power.

The inverter unit 30 may be controlled in the switching operation by the controller 40 and output the converted AC power to the motor 200.

The inverter unit 30 may output the converted 3-phase AC power to the motor 30 through control of the switching operation to control the motor 200.

The controller 40 controls the switching operation of the inverter unit 30.

The controller 40 may control an output of the inverter unit 30 by controlling the switching operation of the inverter unit 30.

The controller 40 may control the switching operation of the inverter unit 30 such that an output of the inverter unit 20 is output as a set value.

The controller 40 detects each of an input and an output of the smoothing unit 20 and the inverter unit 30.

The controller 40 also detects each of an input and an output of the input unit 10.

The controller 40 detects each of a voltage applied to the smoothing unit 20 and an output current of the inverter unit 30 (or an input current of the motor 200).

The controller 40 may also detect an input voltage input to the input unit 10.

On the basis of a result of detecting the voltage of the smoothing unit 20 and the output current of the inverter unit 30, the controller 40 reduces harmonics of the input current input to the input unit 10 by adjusting an output of the inverter unit 30.

That is, the controller 40 may adjust the output of the inverter unit 30 on the basis of the result of detecting the voltage of the smoothing unit 20 and the output current of the inverter unit 30 to reduce harmonics of the input current.

The controller 40 may detect the voltage of the smoothing unit 20 and the output current of the inverter unit 30 and adjust an output of the inverter unit 30 such that harmonics of the input current is reduced on the basis of the detection result.

The controller 40 may extract a harmonic component from the voltage of the smoothing unit 20, calculate a magnitude of the output of the inverter unit 30 on the basis of the output current, and adjust an output of the inverter unit 30 on the basis of the harmonic component and the magnitude of the output of the inverter unit 30.

The harmonic component may be a component generated according to an influence of pulsation of the voltage of the smoothing unit 20 and a switching frequency of the inverter unit 30.

The magnitude of the output of the inverter unit 30 may be a magnitude of output power supplied from the inverter unit 30 to the motor 200.

The controller 40 may calculate a compensation value for compensating the output of the inverter unit 30 on the basis of the harmonic component and the magnitude of the output, and adjust the output of the inverter unit 30 according to the compensation value.

The compensation value may be a value corresponding to the harmonic component.

The compensation value may refer to a value for adjusting the output of the inverter unit 30 to reduce harmonics of the input current.

The compensation value may refer to a value for adjusting the output of the inverter unit 30 to an output allowing the harmonics of the input current to be reduced.

The compensation value may refer to a value for compensating for as much as the harmonic component in the output of the inverter unit 30.

The compensation value may refer to a value for adjusting the output of the inverter unit 30 such that the output of the inverter unit 30 may be compensated for as much as the harmonic component to reduce harmonics of the input current.

That is, the controller 40 may reduce harmonics of the input current by compensating for and adjusting the output of the inverter unit 30 according to the compensation value.

The controller 40 may determine a waveform of the compensation value according to the harmonic component and calculate the compensation value by determining a magnitude of the compensation value according to the output magnitude.

That is, the waveform of the compensation value may correspond to the harmonic component, and the magnitude of the compensation value may correspond to the output magnitude.

The controller 40 may determine the waveform of the compensation value according to the harmonic component, calculate the compensation value by determining the magnitude of the compensation value according to the output magnitude, detect an input voltage input to the input unit 10, and detect a phase of the input voltage to determine a phase of the compensation value according to the phase of the input voltage.

That is, the phase of the compensation value may correspond to the phase of the input voltage.

The controller 40 may control the switching operation of the inverter unit 30 such that the compensation value is reflected in the output of the inverter unit 30, thus adjusting the output of the inverter unit 30.

That is, the controller 40 controls the switching operation of the inverter unit 30 by reflecting the compensation value in control of the output of the inverter unit 30, thereby adjusting the output of the inverter unit 30.

The configuration of the controller 40 for controlling the switching operation of the inverter unit 30 may be the same as shown in FIG. 3.

As illustrated in FIG. 3, the controller 40 may include a speed controller 41 generating a current command (iq*) according to a command speed (ωm), a current controller 42 generating voltage commands (Vd* and Vq*) according to the current command (iq*), a signal generating unit 43 performing α-β/U-V-W conversion on the voltage commands (Vd* and Vq*) and generating a PWM control signal for controlling a switching operation of the inverter unit 30, a current detecting unit 44 detecting and measuring a current output from the inverter unit 30 to the motor 200, a conversion unit 45 performing U-V-W/d-q conversion on the measured current and feeding back the converted current to the current controller 42, a position detecting unit 46 (sensorless controller) detecting a position of the motor 200 on the basis of the conversion result, transferring a measured speed to the speed controller 41, transferring an observed magnetic flux to a magnetic flux controller, and transferring a position detection result ($\theta r$) to the conversion unit 45, and a compensation controller 47 determining a waveform of the compensation value according to the harmonic component, determining a magnitude of the compensation value according to the output magnitude (vdc), and determining a phase of the compensation value according to a phase ($\theta PLL$) of the input voltage to calculate the compensation value (Vcomp), and transferring the compensation value to the signal generating unit 43.

The signal generating unit 43 may receive the compensation value (Vcomp) from the compensation controller 47, generate the PWM control signal controlling the switching operation of the inverter unit 30 based on the voltage commands (Vd* and Vq*) and the compensation value (Vcomp), and transfer the PWM control signal to the inverter unit 30.

Also, the inverter unit 30 may perform the switching operation according to the PWM control signal received from the signal generating unit 43 of the controller 40.

By including the aforementioned components, the controller 40 may generate the control signal according to the compensation value and apply the control signal to the inverter unit 30 to control a switching operation of the inverter unit 30.

A control example of the controller 40 as described above will be described with reference to FIG. 4.

As illustrated in FIG. 4, the controller 40 may detect the input voltage of the input unit 10, the voltage of the smoothing unit 20, and the output current of the inverter unit 30, determine a phase of the compensation value according to a phase of the input voltage of the input unit 10, determine a waveform of the compensation value according to the harmonic component extracted from the voltage of the smoothing unit 20, determine a magnitude of the compensation value according to the output magnitude calculated on the basis of the output current of the inverter unit 30 to calculate the compensation value, and control a switching operation of the inverter unit 30 to reflect the compensation value to adjust an output of the inverter unit 30, thus reducing harmonics of the input current.

The example of the waveform illustrated in FIG. 4 is only an example for explaining a control example of the controller 40, and a waveform according to control of the controller 100 may be different from the waveform shown in FIG. 4.

The result of the control of the controller 100 as described above may be the same as shown in FIG. 5.

As illustrated in FIG. 5, the input current before being compensated with the compensation value and the voltage of the smoothing unit 20 has a waveform pulsated due to the harmonic component. However, after the output of the inverter unit 30 (or, the input current of the motor 200) is compensated with the compensation value, the output of the inverter unit 30 is adjusted to reduce harmonics of the input current, whereby the input current and the voltage of the smoothing unit 20 has a pulsation-reduced waveform.

The input current with reduced harmonics after the controller 40 adjusts the output of the inverter unit 30 based on a result of detecting the voltage of the smoothing unit 20 and the output current of the inverter unit 30 may have a waveform reduced in a portion corresponding to the harmonics from the waveform of the input current before the harmonics is reduced as illustrated in FIG. 6.

In other words, the waveform may have a reduced pulsation as part corresponding to harmonics is reduced from the waveform of the input current before the harmonics is reduced.

The input current with the reduced harmonics may be detected as a waveform in which maximum and minimum peak values are reduced to below a preset reference value, from the waveform of the input current before the harmonics is reduced as illustrated in FIG. 7.

The input current reduced in harmonics may be detected as a waveform in which the maximum and minimum peak values are reduced to below the preset reference value, from the waveform of the input current before the harmonics detected on the basis of the same detection reference is reduced.

In the comparison between FIGS. 6 and 7, as illustrated in FIG. 6, in the waveform of the input current before the harmonics is reduced, the maximum and minimum peak values exceed the preset reference value (±50 A) due to the influence of harmonics, but as illustrated in FIG. 7, in the input current with reduced harmonics, since the harmonics is reduced, the maximum and minimum peak values may be reduced to below the preset reference value.

The examples of waveforms of the input currents illustrated in FIGS. 6 and 7 illustrate waveforms of the input currents before and after the harmonics is reduced, and the waveforms of the input currents may be detected to have waveforms different from those illustrated in FIGS. 6 and 7.

Hereinafter, the method for controlling a motor control device (hereinafter, referred to as a "control method") disclosed in this disclosure will be described, and here, the parts overlapping with those described above in the motor control device will be omitted as much as possible and an embodiment of the control method will be mainly described.

The control method may be a control method of a motor control device.

The control method may be a method for controlling a control device for controlling a motor.

That is, the control method may be a control method for controlling a motor.

The control method may be a control method of a control means included in the motor control device and controlling the motor control device.

The control method may be a control method of a motor control device without an LC filter.

The control method may be a control method for reducing harmonics of an input current of a motor control device without a reactor of an LC filter.

The control method may be a control method for controlling the control device 100 described above.

The control method may be a control method of the controller 40 included in the control device 100 described above.

The control method may be a method for reducing harmonics of an input current of the controller 40 included in the control device 100 described above.

The control method may be a control method of a motor control device including an input unit rectifying AC power input from the outside to DC power, a smoothing unit smoothing the rectified DC power, and an inverter unit converting the smoothed DC power into AC power and outputting the AC power to the motor. As illustrated in FIG. 8, the control method includes detecting a voltage of the smoothing unit and an output current of the inverter unit (S100), calculating a compensation value for compensating for a harmonic component in an output of the inverter unit on the basis of the voltage of the smoothing unit and the output current (S200), and adjusting an output of the inverter unit by controlling a switching operation of the inverter unit such that the compensation value is reflected in the output of the inverter (S300).

The control device may include a reactor forming an LC filter, but hereinafter, an embodiment of the control method will be described on the premise that the control device does not have the reactor.

The smoothing unit may be a film capacitor.

The smoothing unit may be a DC link capacitor formed as a small film capacitor having a small capacity.

As illustrated in FIG. 9, the detecting step (S100) may include detecting a voltage of the smoothing unit (S110) and detecting an output current of the inverter unit (S120).

The detecting step (S100) may further include detecting an input voltage input to the input unit (S130).

That is, in the detecting step (S100), a voltage of the smoothing unit, an output current of the inverter unit, and an input voltage input to the input unit may be detected.

Here, the step (S110) of detecting a voltage of the smoothing unit, the step (S120) of detecting an output current of the inverter unit, and the step (S130) of detecting an input voltage input to the input unit may be performed in order changed in each step, regardless of order, or simultaneously.

As illustrated in FIG. 10, the calculating step (S200) may include extracting a harmonic component from a voltage of the smoothing unit and determining a waveform of the compensation value according to the harmonic component (S210), calculating an output magnitude of the inverter unit on the basis of the output current to determine a magnitude of the compensation value according to the output magnitude (S220), and calculating the compensation value according to a determination result (S240).

The calculating step (S200) may further include detecting a phase of the input voltage and determining a phase of the compensation value according to the phase of the input voltage (S230).

That is, in the calculating step (S200), the compensation value may be calculated by determining a waveform of the compensation value, a magnitude of the compensation value, and a phase of the compensation value.

Here, the step (S210) of determining a waveform of the compensation value, the step (S220) of determining a magnitude of the compensation value, and the step (S240) of determining a phase of the compensation value may be performed in order changed in each step, regardless of order, or simultaneously.

In the adjusting step (S300), harmonics of the input current input to the input unit is reduced, and the input current with reduced harmonics may be detected to have a waveform in which maximum and minimum peak values are reduced to below a preset reference value, from a waveform of the input current before the harmonics is reduced.

Also, as illustrated in FIG. 1, the control method may be a method for controlling the motor control device 100 including the input unit 10 rectifying AC power input from the outside to DC power, a smoothing unit 20 smoothing the rectified DC power, and an inverter unit 30 converting the smoothed DC power into AC power and outputting the AC power to the motor 200. In this case, the detecting step (S100), the calculating step (S200), and the adjusting step (S300) may be performed in the controller 40 controlling a switching operation of the inverter unit 30.

As broadly described and embodied herein, an aspect of the detailed description is to provide a motor control device capable of reducing harmonics of an input current without a reactor, and a method for controlling a motor control device.

Another aspect of the detailed description is to provide a motor control device capable of reducing harmonics of an input current, while using a small-capacity capacitor, and a method for controlling a motor control device.

Another aspect of the detailed description is to provide a motor control device capable of satisfying a performance condition thereof without a component for reducing harmonics, by effectively reducing low-order and high-order harmonics without an LC filter, and a method for controlling a motor control device.

In order to solve the above-mentioned problems, a motor control device and a method for controlling a motor control device disclosed in this specification feature in that harmonics of an input current are reduced by adjusting an output of the inverter.

More specifically, the output of the inverter is controlled such that a harmonic component is compensated in an output of the inverter, thereby reducing harmonics of an input current.

To achieve these and other advantages and in accordance with the purpose of this specification, as embodied and broadly described herein, a motor control device includes: an input unit rectifying AC power input from the outside into DC power; a smoothing unit smoothing the rectified DC power; an inverter unit converting the smoothed DC power into AC power and outputting the converted AC power to a motor; and a controller controlling a switching operation of the inverter unit, wherein the controller adjusts an output of the inverter unit on the basis of a result of detecting a voltage of the smoothing unit and an output current of the inverter unit, and reduces harmonics of an input current input to the input unit.

The smoothing unit may be a film capacitor.

The controller may extract a harmonic component from a voltage of the smoothing unit, calculate an output magnitude of the inverter unit on the basis of the output current, and adjust an output of the inverter unit on the basis of the harmonic component and the output magnitude.

The controller may calculate a compensation value for compensating for an output of the inverter unit on the basis of the harmonic component and the output magnitude and adjust an output of the inverter unit according to the compensation value.

The controller may calculate the compensation value by determining a waveform of the compensation value according to the harmonic component and determining a magnitude of the compensation value according to the output magnitude.

The controller may detect an input voltage input to the input unit, detect a phase of the input voltage and determine a phase of the compensation value according to the phase of the input voltage.

The controller may adjust an output of the inverter unit by controlling a switching operation of the inverter unit such that the compensation value is reflected in the output of the inverter unit.

The input current with reduced harmonics may be detected as a waveform in which maximum and minimum peak values are reduced to below a preset reference value, from a waveform of the input current before the harmonics is reduced.

To achieve these and other advantages and in accordance with the purpose of this specification, as embodied and broadly described herein, a method for controlling a motor control device including an input unit receiving AC power from the outside, a rectifying unit rectifying the input AC power into DC power, a smoothing unit smoothing the rectified DC power, and an inverter unit converting the smoothed DC power into AC power and outputting the converted AC power to a motor, includes: detecting a voltage of the smoothing unit and an output current of the inverter unit; calculating a compensation value for compensating for a harmonic component in an output of the inverter unit on the basis of the voltage of the smoothing unit and the output current; and adjusting an output of the inverter unit by controlling a switching operation of the inverter unit such that the compensation value is reflected in the output of the inverter unit.

The smoothing unit may be a film capacitor.

The detecting may include detecting a voltage of the smoothing unit and detecting an output current of the inverter unit.

The detecting may include detecting an input voltage input to the input unit.

The calculating may include: extracting a harmonic component from the voltage of the smoothing unit and determining a waveform of the compensation value according to the harmonic component; calculating an output magnitude of the inverter unit on the basis of the output current and determining a magnitude of the compensation value according to the output magnitude; and calculating the compensation value according to a determination result.

The calculating may further include: detecting a phase of the input voltage and determining a phase of the compensation value according to the phase of the input voltage.

In the adjusting, harmonics of the input current input to the input unit is reduced, and the input current with reduced harmonics may be detected as a waveform in which maximum and minimum peak values are reduced to below a preset reference value; from a waveform of the input current before the harmonics is reduced.

As described above, in the motor control device and the method for controlling a motor control device disclosed in this specification, since harmonics of an input current is reduced by adjusting an output of the inverter, harmonics of the input current may be reduced without a component for reducing harmonics.

Thus, in the motor control device and the method for controlling a motor control device disclosed in this specification, a DC reactor may not be required and since a DC link capacitor is reduced in size and simplified, a structural restriction of the motor control device according to the presence of the DC reactor and the DC link capacitor may be improved.

Also, in the motor control device and the method for controlling a motor control device disclosed in this specification, since the structural restriction of the motor control device is improved, the motor control device may become compact and may be simplified and may be easily manufactured and designed.

Also, in the motor control device and the method for controlling a motor control device disclosed in this specification, since the DC reactor may be eliminated and the DC link capacitor is reduced in size and simplified, cost incurred for manufacturing and design may be reduced.

In addition, in the motor control device and the method for controlling a motor control device disclosed in this specification, a performance condition of the motor control device may be satisfied without a component for reducing harmonics, and efficiency of the motor control device may be maintained.

In addition, in the motor control device and the method for controlling a motor control device disclosed in this specification, since the low-order and high-order harmonics of the input current are reduced through the control scheme of a switching operation, usability and utilization of the motor control device may be promoted and development of a motor control technique in the motor control technique field and harmonics reducing technique may be accelerated.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the scope of the disclosure will become apparent to those skilled in the art from the detailed description.

The foregoing embodiments and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor control device comprising:
   an input unit that rectifies an external AC power into DC power;
   a smoothing circuit to smooth the rectified DC power;
   an inverter that converts the smoothed DC power into AC power and outputs the converted AC power to a motor; and
   a controller that controls a switching operation of the inverter to compensate for harmonics at the input unit,
   wherein the controller detects a voltage at the smoothing circuit and an output current of the inverter, calculates a compensation value that corresponds to a harmonic component in an output of the inverter based on the detected voltage at the smoothing circuit and the output current of the inverter, and controls the switching operation of the inverter to compensate for harmonics at the input unit by adjusting the output of the inverter based on the detected voltage of the smoothing circuit and the output current of the inverter to reflect the compensation value,
   wherein the compensation value includes a waveform, a magnitude, and a phase corresponding to the harmonic component in the output of the inverter,
   wherein, when the controller calculates the compensation value, the controller further extracts a harmonic component from the voltage at the smoothing circuit, calculates an output magnitude of the inverter based on the output current of the inverter, calculates the compensation value further based on the extracted harmonic component from the voltage at the smoothing circuit, and determines the magnitude of the compensation value based on the output magnitude of the inverter,
   wherein the controller further adjusts the output of the inverter according to the harmonic component extracted from the voltage at the smoothing circuit and the output magnitude of the inverter, and
   wherein the output of the inverter that is compensated for harmonics is detected as a waveform in which maximum and minimum peak values are reduced a prescribed amount relative to a waveform of the output before compensating for harmonics.

2. The motor control device of claim 1, wherein the smoothing circuit does not include an LC resonant circuit.

3. The motor control device of claim 2, wherein the smoothing circuit does not include a reactor between the input unit and the inverter.

4. The motor control device of claim 1, wherein the smoothing circuit is a film capacitor.

5. The motor control device of claim 1, wherein the controller further calculates the compensation value for adjusting the output of the inverter based on the output magnitude.

6. The motor control device of claim 5,
   wherein the controller determines the waveform of the compensation value based on the extracted harmonic component.

7. The motor control device of claim 6, wherein the controller detects an input voltage input to the input unit, detects a phase of the input voltage and determines the phase of the compensation value based on the phase of the input voltage.

8. The motor control device of claim 5, wherein the controller adjusts the output of the inverter by controlling a switching operation of the inverter such that the compensation value is reflected in the output of the inverter.

9. A method for controlling a motor control device including an input unit that receives external AC power, a rectifier that rectifies the external AC power into DC power, a smoothing circuit to smooth the rectified DC power, and an inverter that converts the smoothed DC power into AC power for output to a motor, the method comprising:
   detecting a voltage at the smoothing circuit and detecting an output current of the inverter;
   calculating a compensation value that corresponds to a harmonic component in an output of the inverter based on the detected voltage of the smoothing circuit and the output current of the inverter; and adjusting the output of the inverter by controlling a switching operation of the inverter such that the compensation value is reflected in the output of the inverter, wherein the compensation value includes a waveform, a magnitude and a phase corresponding to the harmonic component at the output of the inverter, wherein calculating the compensation value includes:
extracting a harmonic component from the voltage at the smoothing circuit and determining the waveform of the compensation value according to the extracted harmonic component; and
calculating an output magnitude of the inverter based on the output current of the inverter and determining a magnitude of the compensation value based on the output magnitude of the inverter,
wherein adjusting the output of the inverter includes reducing the output of the inverter by an amount corresponding to harmonics of the input current at the input unit, and
wherein an output current at the inverter with reduced harmonics is detected as a waveform in which maximum and minimum peak values are reduced a prescribed amount relative to a waveform of the output before harmonics are reduced.

10. The motor control device of claim 9, wherein the smoothing circuit does not include an LC resonant circuit.

11. The motor control device of claim 10, wherein the smoothing circuit does not include a reactor between the input unit and the inverter.

12. The method of claim 9, wherein the smoothing circuit is a film capacitor.

13. The method of claim 9, wherein detecting the voltage of the smoothing circuit and the output current of the inverter includes:
first detecting the voltage of the smoothing circuit; and
detecting the output current of the inverter after detecting the voltage of the smoothing circuit.

14. The method of claim 13, further comprising:
detecting an input voltage at the input unit.

15. The method of claim 14, wherein calculating the output magnitude of the inverter further includes:
detecting a phase of the input voltage; and
determining the phase of the compensation value based on the phase of the input voltage.

16. A motor control device comprising:
a rectifier circuit that converts received alternating current (AC) power into direct current (DC) power;
a capacitor that is positioned in parallel to rectifier circuit to smooth the converted DC power;
an inverter that converts the smoothed DC power into AC power and outputs the converted AC power to a motor; and
a controller that controls a switching operation of the inverter to compensate for harmonics at the rectifier circuit,
wherein the controller, when controlling the switching operation of the inverter to compensate for harmonics at the rectifier circuit, detects a voltage at the capacitor and an output current of the inverter, calculates a compensation value that corresponds to a harmonic component in an output of the inverter based on the detected voltage at the capacitor and the output current of the inverter, and adjusts the output of the inverter according to the harmonic component in an output of the inverter and the output current of the inverter to reflect the compensation value,
wherein the compensation value includes a waveform, a magnitude and a phase corresponding to the harmonic component in the output of the inverter,
wherein when the controller calculates the compensation value, the controller extracts a harmonic component from the voltage at the capacitor, further calculates the compensation value based on the harmonic component extracted from the voltage at the capacitor, calculates an output magnitude of the inverter based on the output current of the inverter, and determines the magnitude of the compensation value based on the output magnitude of the inverter, and
wherein the output of the inverter that is compensated for harmonics is detected as a waveform in which maximum and minimum peak values are reduced a prescribed amount relative to a waveform of the output before compensating for harmonics.

17. The motor control device of claim 16, wherein the controller further calculates the compensation value for adjusting the output of the inverter based on the output magnitude.

18. The motor control device of claim 17,
wherein the controller further determines the waveform of the compensation value based on the harmonic component extracted from the voltage at the capacitor.

19. The motor control device of claim 18, wherein
the controller further detects an input voltage input to the input unit, detects a phase of the input voltage and determines the phase of the compensation value based on the phase of the input voltage.

20. The motor control device of claim 17, wherein the controller further adjusts the output of the inverter by controlling a switching operation of the inverter such that the compensation value is reflected in the output of the inverter.

* * * * *